Figure 1:
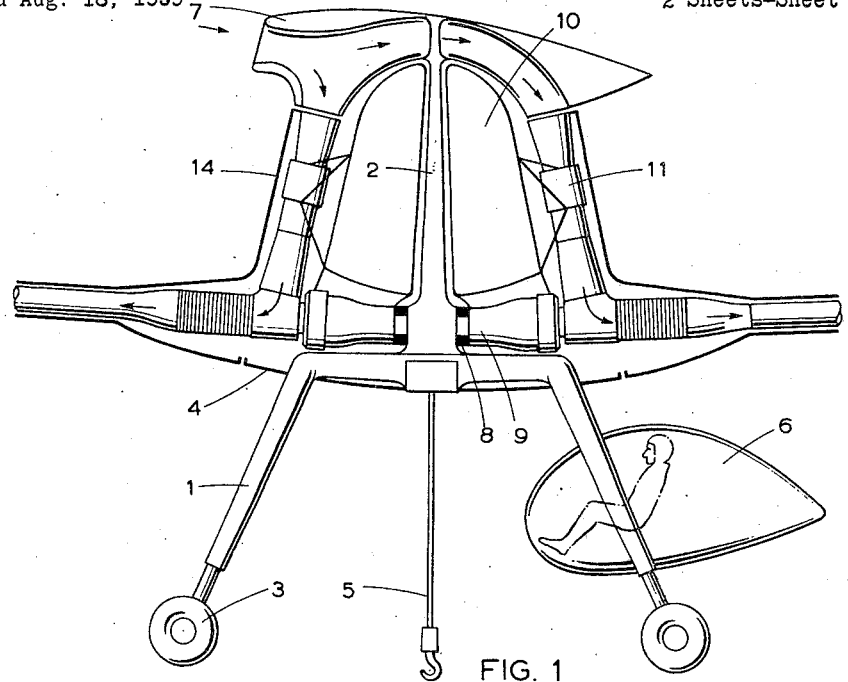

June 12, 1962  C. BRADBURY  3,038,684
AIRCRAFT OF THE ROTATING WING TYPE
Filed Aug. 18, 1959  2 Sheets-Sheet 1

INVENTOR
by CHARLES BRADBURY

June 12, 1962     C. BRADBURY     3,038,684
AIRCRAFT OF THE ROTATING WING TYPE

Filed Aug. 18, 1959     2 Sheets-Sheet 2

INVENTOR
by CHARLES BRADBURY ated June 12, 1962

3,038,684
AIRCRAFT OF THE ROTATING WING TYPE
Charles Bradbury, Fetcham, England, assignor to Blackburn Aircraft Limited, Brough, Yorkshire, England, a British company
Filed Aug. 18, 1959, Ser. No. 834,449
Claims priority, application Great Britain Feb. 12, 1959
12 Claims. (Cl. 244—17.11)

This invention relates to rotary-wing aircraft and is particularly concerned with a "flying-crane" type of helicopter which carries its payload externally suspended beneath it.

In the case of the conventional shaft-driven helicopter at least two rotors are required to achieve a balance of torque, and particularly with a multi-engined helicopter, the two rotors give rise to a complex system of gearboxes, shafting and constant speed linkages which increase its initial and maintenance costs and make acceptable reliability difficult to achieve. These mechanical components tend to become disproportionately heavy in the case of large helicopters with their necessarily slow turning rotors.

The gas-driven helicopter, in which the blades are motivated by tip jets of gas supplied to the rotor-blades through rotating seals at the hub (the gas-supplying units being static), offers greatly improved simplicity as the mechanical components referred to are eliminated and, having a torque-balanced lifting rotor, requires no additional rotor for torque compensation. With such helicopter design, it is not possible readily to incorporate a multiplicity of engines since this involves either problems of engine matching (with a common ducting) or of sealing and ducting complexity (with isolated engine-ducting arrangements).

The invention is therefore, primarily concerned with the arrangement of the power-plant in relation to the lifting rotor blades of a multi-engined tip-jet driven helicopter, particularly large helicopters and those of the flying-crane type, and has for its object to provide a vertical ascent and descent rotary wing aircraft having its lifting rotor blades motivated by a propulsion gas duct system in which rotating seals are avoided, in a construction having a minimum of useless weight and without antitorque means which, by virtue of its simplicity and lack of mechanical complexity in spite of a multiplicity of engines, offers a very marked improvement over a hub-drive machine and a considerable one over an orthodox tip-jet driven machine, especially as regards reliability and safety.

To this end the rotary-wing aircraft according to the present invention has two or more gas generating engines, for feeding jet discharge propulsion gases to the lifting blades, mounted with their fuel and oil tanks as a rotatable assembly with the lifting blades and rotatable about an axle carrying a light non-rotary structure provided with landing gear and pilots accommodation and surmounted by an air-intake housing feeding air to the engines. Thus the engines, which are mounted near the rotation axis, are subject to a minimum of centrifugal force and feed their propulsion gases to ducts in the lifting blades through flexible ducting to allow for blade change of pitch and feathering.

Each power-plant may be arranged to feed gas to one, rotor blade but, further according to the present invention there is one engine for each lifting blade, a preferred arrangement being two engines for each blade feeding either common or separate ducts when a balance of forces may be maintained with various members of engines inoperative which allows optimum fuel economy to be achieved for various operational roles, and the failure of one or more engines may have a relatively slight effect on performances, especially in hovering flight.

The gas producing engines, which may be gas turbine engines designed for vertical operation, are positioned with the axes of their major rotating parts substantially parallel to the axis of rotation of the rotor in order to minimize gyroscopic effects upon the power units. However various other types of gas-producing power units may be installed such as reciprocating or turbine engines driving blowers or compressors, free-piston gas generators, monopropellant or bi-propellant liquid fuel turbines driving compressors, or any other units producing hot or cold gases suitable for propulsion.

Still further according to the present invention, a structure comprising a plurality of landing wheel legs and the rotation axle carries an under housing containing hoisting gear, blade-pitch control mechanism, and other gear with the air intake housing mounted on the end of the axle, while the rotary assembly runs on the axle through the intermediary of bearings and its engines, tanks and so forth are contained within removable external panels.

The pilot accommodation as a separate housing or nacelle may be carried by a structure depending from the under-housing but preferably according to yet another feature of the invention such accommodation is carried by one of the landing wheel legs.

In order that the essential features of the helicopter aircraft according to the present invention may be more readily appreciated, an embodiment is by way of example hereinafter more particularly described with reference to the accompanying drawings which are given for purposes of illustration only and not of limitation.

Figure 2:
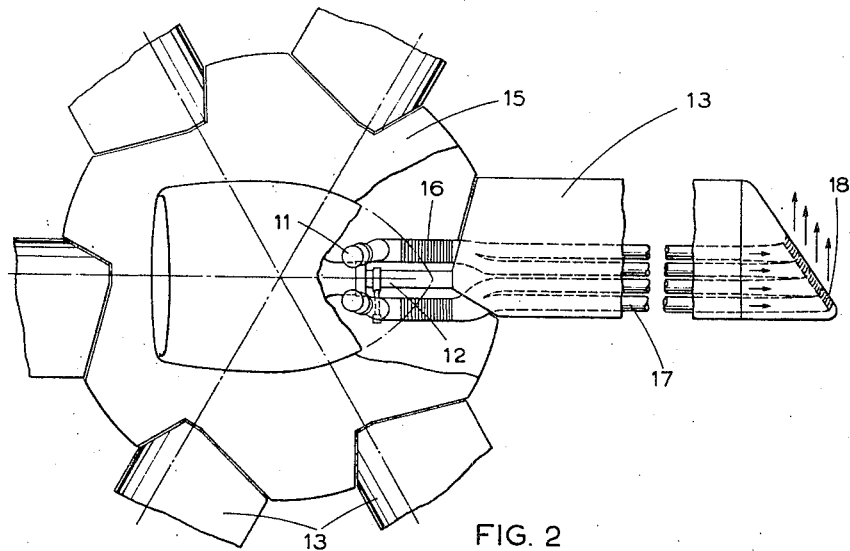
Figure 3:
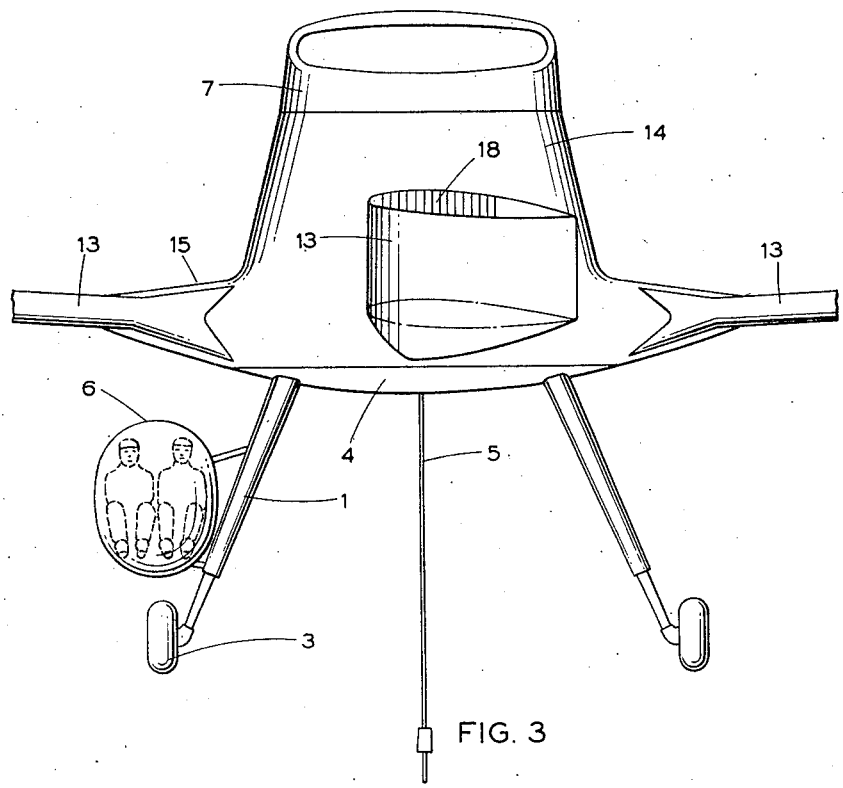
Figure 4:
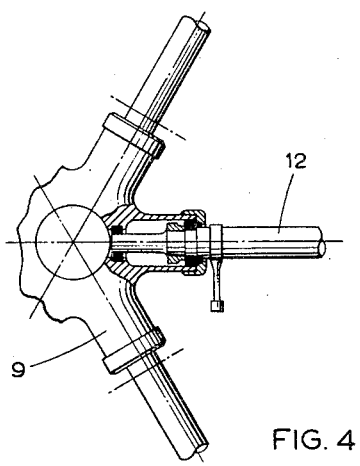

In these drawings:
FIGURE 1 is a sectional elevation of a helicopter powered by a plurality of combustion turbine engines,
FIGURE 2 is a plan view looking down on FIGURE 1,
FIGURE 3 is a front elevation being a view as seen from the left-hand side of FIGURE 1, and
FIGURE 4 is a scrap part-sectioned plan view showing the blade root attachment.

The helicopter illustrated in the said drawings is of large size as an embodiment of flying crane with six lifting blades each individually motivated by jets of gas generated by two engines to each blade.

The basic construction comprises a structure consisting of a plurality, conveniently four, landing wheel legs 1 and an oppositely extending centrally disposed axle 2. Each leg 1 carries at its lower extremity a landing wheel 3 through the intermediary of an oleo or equivalent shock-absorbing device. This structure also carries an under-housing or cowling 4 which contains hoisting gear, such as a centrally disposed winch for the lifting cable 5, as well as pitch varying mechanism effective on the lifting blades and also other mechanism as will be mentioned hereinafter. The understructure 4 may carry a depending arm supporting pilots accommodation or nacelle 6 but preferably such nacelle will be carried by one of the landing-wheel legs substantially as illustrated in the said drawings.

Fast on the upper end of the axle 2 is an air-intake housing or chamber 7 having a forward facing air entry.

On the axle 2 rotates through the intermediary of a bearing 8 a rotatable assembly 9 on which is mounted fuel (or fuel and oil) tanks 10, combustion turbine gas generating engines 11 and the roots 12 of the lifting blades 13 and their ancilliary equipment, such tanks being cylindrical or frustrum shape with spherical ends and carrying mountings for the respective engines. The engines 11 and the tanks 10 and adjacent parts are enclosed in external, desirably removable, panels forming an outer casing 14 merging into a peripheral shell 15 complementary of the under-housing 4 and beyond which the lifting blades extend substantially as illustrated.

Each engine 11 is preferably a combustion turbine engine of a design intended for operation with its major axis vertical so that the axis of its rotating parts are parallel to the axis of the axle 2 or at a small angle thereto so that their axes form a cone. Preferably, and as illustrated there are two engines 11 to each lifting blade 13 and each engine feeds through flexible ducting 16 a duct or ducts 17 extending through its lifting blade 13 for discharge through a cascade 18 of curved blades which turn the gas flow through 90° and which reduce the duct area to act as a nozzle exhausting the gases tangentially to drive round the blades 13. By these means air entering the intake housing 7 feeds to the engines 11, without requiring rotating seals or other such means as no close sealing is required, and is compressed by such engines (which are preferably derated to provide a gas delivery temperature which is reasonable low say of the order 500° C.) and fed as stated to drive the lifting blades 13.

The rotary assembly rotates about the axle 2 with respect to the non-rotating structure, comprising the under-housing 4 and landing legs 1, pilot accommodation and the air intake housing 7, which non-rotating structure may be orientated in space by means of servo-motors producing rotation relative to the rotary assembly. There are at least two servo motors, to cover for the failure of one, and they are mounted on the rotary assembly and geared to mesh with a toothed ring fast with the non-rotating structure. Such motors may be accelerated or decelerated to orientate the non-rotating structure, and as their construction and operation is well appreciated by those skilled in the art they are not more fully described herein. The servo motors are conveniently driven by gases from the main gas producing engines or turbines 11.

Control in pitch and altitude is also effected by suitable servos producing collective and cyclic changes in blade angles of pitch in a substantially conventional manner.

Each lifting blade 13 is mainly of steel construction and desirably has a light alloy trailing edge, and has a root tube 12 capable of turning and bending with respect to the rotary assembly 9 by which it is carried. Preferably as illustrated in FIGURE 4, the blade root 12 has a tapered extremity rotatable in part of the base of the rotary assembly and forming pivot connecting means.

I claim:

1. A rotating wing aircraft including a plurality of lifting blades, a central rotary structure, means for connecting said blades to a rotatable structure, a plurality of gas generating engines with their fuel and oil tanks mounted on said rotatable structure adjacent the axis of rotation, means in said rotary structure for feeding the gases from said engines to said blades to be discharged as jets at the free ends thereof, an axle about which said rotatable structure may rotate, a non-rotary structure at the lower end of said axle, landing gear depending from said non-rotary structure, pilot accommodation carried by said non-rotary structure, and an air-intake housing at the upper end of said axle for feeding air to said gas generating engines.

2. A rotating wing aircraft including a plurality of lifting blades, a central rotatable structure, pivot means connecting each of said blades to said rotatable structure, at least one gas generating engine to each of said blades, means for mounting all said gas generating engines on said rotatable structure adjacent the axis of rotation, means for feeding gas from each of said gas generating engines to its associated one of said blades located within said rotary structure, jet means at the free end of each of said blades discharging said gas, an axle about which said rotatable structure rotates, a non-rotatable structure at the lower end of said axle, landing gear comprising a plurality of legs depending from said non-rotatable structure, pilot accommodation carried by one of said landing gear legs, and an air-intake housing at the upper end of said axle for feeding air to said gas generating engines.

3. A rotating wing aircraft, including a plurality of lifting blades each having at least one duct extending therethrough from the inner end thereof to the outer end thereof, a central rotatable structure, pivot means for connecting said inner end of each of said lifting blades to said rotatable structure, a number of compressed gas generating engines corresponding to the number of said lifting blades, means for mounting each of said engines on said rotatable structure adjacent the center of rotation thereof, flexible means for feeding compressed gas from said engines individually to the ducts in said blades, jet means at said outer ends of said blades for discharging said gases as propulsive jets, an axle about which said rotatable structure rotates, landing gear including a plurality of legs fast with the lower end of said axle, pilot accommodation carried by one of said landing gear legs, a housing fast at the upper end of said axle, an air-intake to said housing, and means for feeding air entering said intake to said gas generating engines.

4. A rotating wing aircraft, including a plurality of lifting blades each having at least two internal ducts extending therethrough from the inner end thereof to the outer end thereof, a central rotatable structure, pivot means for connecting said inner end of each of said lifting blades to said rotatable structure, two compressed gas generating engines to each of said blades, flexible means for feeding compressed gas from each of said engines to one of said internal ducts, means for mounting all said engines with their fuel and oil tanks on said rotatable structure adjacent the center of rotation thereof, cascade means at said outer ends of said blades for discharging said gases from said ducts as propulsive jets, a vertically extending axle about which said rotatable structure rotates, landing gear including a plurality of legs fast with the lower end of said axle, pilot accommodation carried by one of said landing gear legs, a housing fast at the upper end of said axle, an air-intake to said housing, and means for feeding air entering said intake to said gas generating engines.

5. A rotating wing aircraft comprising a non-rotatable structure including landing gear and pilot accommodation and carrying a vertically extending axle having an air-intake housing affixed to its upper end, and a central rotatable structure rotatable on said axle, said rotatable structure having mounted thereon a plurality of lifting blades and an engine adjacent the axis of rotation for feeding compressed gases to be discharged as propulsive jets at the tips of said lifting blades, said engine being mounted within the rotatable structure.

6. A rotating wing aircraft including a landing gear structure having a substantially vertical stationary axle, pilot accommodations carried by said landing gear structure, and a rotatable structure mounted on said landing gear structure axle and including thereon: a plurality of lifting blades including means adjacent the free ends of said blades for expelling jets of gas, and gas generating engine means including means for directing generated gases to said blades for expulsion at the ends thereof, said gas generating engine means and said lifting blades being rotatable together as portions of said rotatable structure.

7. A rotating wing aircraft according to claim 6, said landing gear including an upwardly extending axle, and said rotating structure being rotatably mounted thereon.

8. A rotating wing aircraft including a landing gear structure, pilot accommodations carried by said landing gear structure, and a rotatable structure mounted on said landing gear structure and including thereon: a plurality of lifting blades including means adjacent the free ends of said blades for expelling jets of gas, and a central rotatable structure adjacent the axis of rotation of said blades including gas generating engine means having means for directing gases to said blades for expulsion at the ends thereof, said rotating structure including a central compartment and said gas generating engine means including an air intake defined at the upper end of said rotating structure, and a stationary portion connected to said landing gear structure and located above said rotary structure including air intake means in communication with said gas generating means and intake.

9. A rotating wing aircraft including a stationary landing gear structure having an upwardly extending axle affixed thereto, pilot accommodations carried by said landing gear structure, and structure rotatably supported on said axle including: a plurality of lifting blades having means adjacent the free ends for expelling jets of gas, and a central rotatable portion with gas generating engine means disposed adjacent the axis of rotation for rotation therearound and including means for directing gases to said blades for expulsion at the ends thereof, said lifting blades and said gas generating engine means being rotatable together as portions of said rotatable structure.

10. A rotating wing aircraft including a landing gear structure having an upwardly extending axle, pilot accommodations carried by said landing gear structure, and a structure rotatably supported on said axle including: a plurality of lifting blades having means adjacent the free ends for expelling jets of gas, and a central rotatable portion with gas generating engine means disposed adjacent the axis of rotation for rotation therearound and including means for directing gases to said blades for expulsion at the ends thereof, said gas generating means including fuel tanks rotatably supported adjacent said axle, at least one gas generator forward of said fuel tanks and duct means for directing said generator to said blades for expulsion at the ends thereof.

11. A rotating wing aircraft including a stationary landing gear structure having an upwardly extending axle affixed thereto, pilot accommodations carried by said landing gear structure, a structure rotatably supported on said axle including: (a) a plurality of lifting blades having means adjacent the free ends for expelling jets of gas, (b) gas generating engine means disposed adjacent the axis of rotation for rotation therearound, and (c) means for directing gases to said blades for expulsion at the ends thereof; and a stationary air intake housing supported on said axle above said rotary structure including air duct means communicating with said gas generating engine means.

12. A rotating wing aircraft comprising a landing gear structure having an upwardly extending stationary axle, and a structure rotatably supported on said axle including a central portion with a plurality of substantially vertically disposed engines arranged close to the axis of rotation of said structure, and a plurality of lifting blades extending outwardly from said central portion with inner ends adjacent said engines and including means for receiving gases from said engines and expelling said gases adjacent the outer ends of said blades, said engines and said blades being rotatable together as portions of said rotatable structure.

References Cited in the file of this patent
UNITED STATES PATENTS

| | | |
|---|---|---|
| 2,443,936 | Stalker | June 22, 1948 |
| 2,464,726 | Stalker | Mar. 15, 1949 |
| 2,633,922 | Svenson | Apr. 7, 1953 |
| 2,689,615 | Fletcher | Sept. 21, 1954 |
| 2,862,680 | Berger | Dec. 2, 1958 |